(12) United States Patent
Yoshida

(10) Patent No.: US 7,427,249 B2
(45) Date of Patent: Sep. 23, 2008

(54) HYDRAULIC TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 469 days.

(21) Appl. No.: 11/030,021

(22) Filed: Jan. 6, 2005

(65) Prior Publication Data
US 2005/0255952 A1 Nov. 17, 2005

(30) Foreign Application Priority Data
May 14, 2004 (JP) .............................. 2004-145278

(51) Int. Cl.
*F16H 7/08* (2006.01)
(52) U.S. Cl. .................................................. 474/110
(58) Field of Classification Search ............... 474/101, 474/109, 110; 137/513.7, 533.15, 538, 539, 137/848
See application file for complete search history.

(56) References Cited

U.S. PATENT DOCUMENTS

| 720,100 | A | * | 2/1903 | Bashlin .................... 137/515.7 |
| 4,286,622 | A | * | 9/1981 | Ninomiya et al. ...... 137/533.11 |
| 4,365,648 | A | * | 12/1982 | Grothe ........................ 137/539 |
| 4,894,047 | A |  | 1/1990 | Breon et al. |
| 5,044,391 | A | * | 9/1991 | Brumfield .................... 137/151 |
| 5,700,213 | A |  | 12/1997 | Simpson et al. |
| 5,967,180 | A | * | 10/1999 | Yates, III .................... 137/539 |
| 6,244,295 | B1 | * | 6/2001 | Bartussek et al. ........... 137/540 |
| 6,382,230 | B1 | * | 5/2002 | Lang ........................ 137/15.22 |
| 7,096,883 | B2 | * | 8/2006 | Gessat et al. ............. 137/493.8 |
| 7,174,799 | B2 | * | 2/2007 | Yoshida et al. .............. 474/110 |
| 2004/0266572 | A1 | * | 12/2004 | Yoshida et al. .............. 474/110 |
| 2005/0096166 | A1 | * | 5/2005 | Wakabayashi et al. ...... 474/110 |
| 2005/0227799 | A1 | * | 10/2005 | Yoshida ........................ 474/110 |
| 2005/0265856 | A1 | * | 12/2005 | Yoshida ........................ 417/362 |

FOREIGN PATENT DOCUMENTS

| DE | 3112932 A1 | * | 12/1982 |
| EP | 1 223 364 A1 |  | 7/2002 |
| EP | 1 493 944 A1 |  | 5/2005 |
| JP | 2003-056657 |  | 2/2003 |
| JP | 2003-247616 |  | 9/2003 |

* cited by examiner

*Primary Examiner*—Vicky A Johnson
(74) *Attorney, Agent, or Firm*—Howson & Howson LLP

(57) ABSTRACT

In the check valve unit of a hydraulic tensioner a check ball guide has an inner wall surrounding a check ball. This wall is provided with a plurality of oil communicating grooves, formed by cutting away parts of the inner wall of the guide. These grooves carry oil past the ball from the oil supply toward a high pressure oil chamber of the tensioner, when the ball moves away from its seat.

3 Claims, 6 Drawing Sheets

HYDRAULIC TENSIONER

FIELD OF THE INVENTION

This invention relates to a hydraulic tensioner for applying proper tension to an endless, flexible, transmission medium, for example, a timing belt or a timing chain in a vehicle engine.

BACKGROUND OF THE INVENTION

Hydraulic tensioners have been widely used to maintain proper tension in timing chains and timing belts, which transmit rotation between the crankshaft and one or more camshafts in a vehicle engine. These tensioners also prevent vibration generated by travel of a transmission chain or belt.

As shown in FIG. 7, a conventional hydraulic tensioner 500 comprises a plunger 520 slidably protruding from a plunger accommodating hole 511 formed in a housing 510. A plunger-biasing spring 530 is accommodated in a high pressure oil chamber R, formed between the plunger-accommodating hole 511 and the plunger 520, to bias the plunger 520 in the protruding direction. A check valve unit 540, incorporated in a bottom portion of the plunger-accommodating hole 511, blocks reverse flow of oil out of the high pressure oil chamber R. The check valve unit 540 comprises a check ball 541, a ball seat 544 which faces the check ball 541, a conical coil spring 545, which biases the check ball 541 onto the ball seat 544, and a retainer 542, which supports the conical coil spring 545 and limits the movement of the check ball 541.

As shown in FIG. 8, a clearance, $D1-d1$, is provided between the check ball 541 and the retainer 542 to ensure the proper rate of inflow of oil for the maximum area of the opening obtained when the check valve is opened. (See, for example, Japanese Laid-open Patent Publication No. 2003-247616, Page 1, FIG. 1.) The check ball valve 541 moves irregularly in this clearance, and consequently, a violent motion of the check ball 541 is generated. As a result of this irregular and violent motion of the check ball, the hydraulic tensioner cannot adequately follow changes in tension, especially when the engine is operating at high rotational speeds. Adequate follow-up properties are particularly difficult to achieve especially when the hydraulic tensioner is disposed laterally on the engine, since, when the direction of flow through the check valve is not vertically upward, for example when the direction of flow is horizontal, gravity displaces the check ball from alignment with its seat, further contributing to the irregular and violent movement of the check ball.

The clearance between the ball and the inner wall of the ball guide should be sufficient to ensure that the inflow rate of oil corresponds to the maximum area of the opening between the check ball 541 and seat 544, so that the ball does not restrict oil flow when the check valve is fully opened. However, the above-mentioned clearance is influenced by the stroke of the check ball. That is, when the stroke of the check ball is increased, the maximum area of the opening between the check ball and the retainer must be increased in order to ensure adequate flow of oil. As a result, in the case of a check valve having a relatively long stroke, the necessary clearance between the ball and the inner wall of the ball guide is larger than in the case of a check valve having a relatively short stroke. Accordingly, in the conventional hydraulic tensioner the violent motion of the check ball could not be suppressed.

Objects of the invention are to solve the above-mentioned problems of the prior art, and to provide a hydraulic tensioner which can suppress violent motion of the check ball in its check valve unit, and accurately follow changes in tension, especially at high rotational speeds, irrespective of the stroke of the check valve and the arrangement of the tensioner.

SUMMARY OF THE INVENTION

A preferred hydraulic tensioner according to the invention comprises a tensioner housing having a plunger-accommodating hole. The hole has an opening at one end and a bottom. A plunger is slidable in the plunger-accommodating hole and protrudes therefrom. This plunger is adapted to maintain tension in an endless transmission chain or other flexible, traveling power transmission medium. The plunger and the housing together cooperate to define a high pressure oil chamber. A plunger biasing spring, accommodated in the high pressure oil chamber, urges the plunger in a protruding direction. A check valve unit at the bottom of the plunger-accommodating hole allows oil to flow into the high pressure oil chamber from an oil supply, but blocks reverse flow of oil from the high pressure oil chamber. The check valve unit comprises a check ball, a ball seat, and a ball guide having a side facing the high pressure oil chamber. The ball guide includes an inner wall surrounding the check ball. The check valve unit also comprises a disc-shaped retainer including an oil communicating hole, attached to the ball guide on the side thereof facing the high pressure oil chamber. The check ball is sealed in the ball guide, but is freely movable therein, toward and away from the ball seat, to allow oil to flow through the ball seat of the check valve unit, and through the guide and the oil communicating hole of the retainer, into the high pressure oil chamber. The ball, however, blocks reverse flow of oil out of the high pressure oil chamber by seating against the ball seat. A plurality of oil communicating grooves is formed on the inner wall of the ball guide an inner wall. These grooves provide an oil communication path, past the check ball, from the ball seat toward the high pressure oil chamber when the ball moves away from the ball seat. The ball is prevented from violent movement within the ball guide by the inner wall of the guide.

With the above structure, the hydraulic tensioner can apply appropriate tension to a timing chain, a timing belt or the like in a vehicle engine. Moreover, the plurality of oil communicating grooves, formed by cutting away parts of an inner wall of the ball guide, ensure that the inflow rate corresponding to the maximum opening of the check valve is maintained while providing the minimum clearance needed for free motion of the check ball. This minimum clearance is not influenced by the inflow rate of oil corresponding to the maximum degree of opening of the check valve, as is the case with prior check valve structures. As a result the hydraulic tensioner in accordance with the invention can suppress violent motion of the check ball in the check valve unit, and achieve accurate follow-up properties when changes in tension occur, especially at high engine speeds. Moreover, the violent check ball motion and its adverse effects are avoided irrespective of the stroke of the check valve and irrespective of the arrangement of the tensioner.

DETAILED DESCRIPTION OF THE PREFERRED EMBODIMENTS

Figure 1:
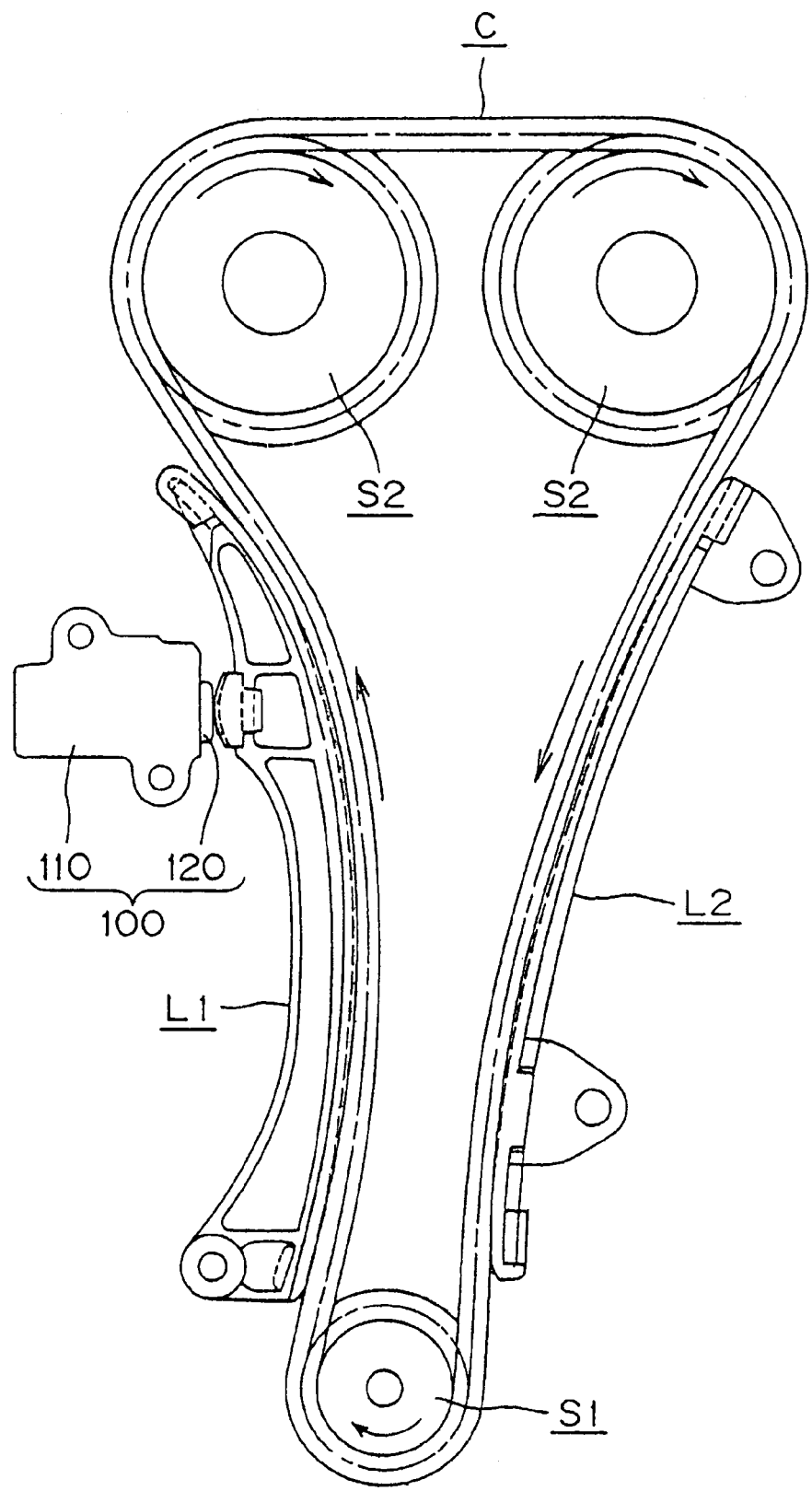
FIG. 1 is a schematic view showing a hydraulic tensioner in accordance with the invention in use in the timing transmission of a dual overhead cam internal combustion engine.
Figure 2:
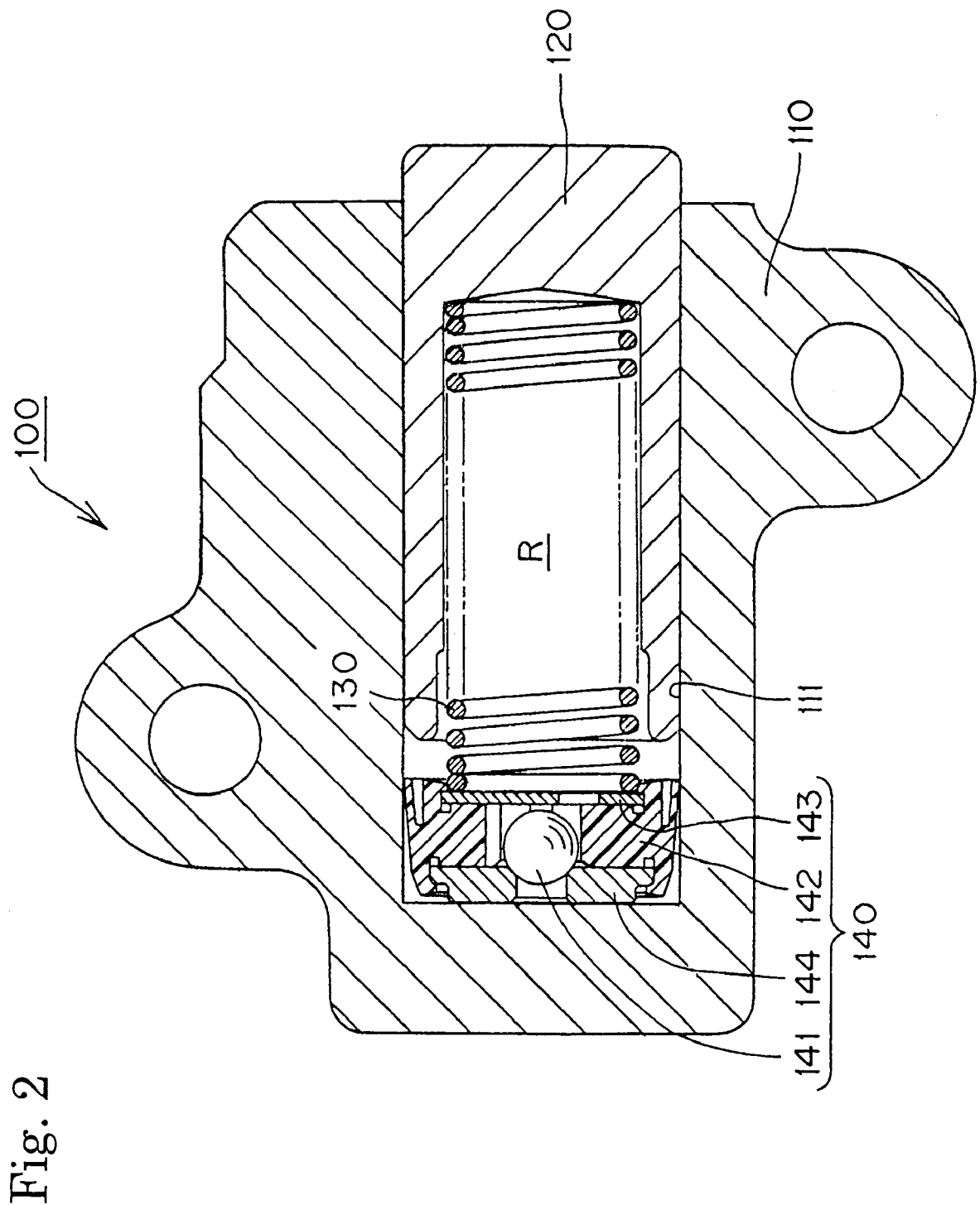
FIG. 2 is a cross-sectional view of the hydraulic tensioner of FIG. 1.

As shown in FIGS. 1 and 2, a hydraulic tensioner 100, which is attached to an engine body (not shown), applies tension to the slack side of a timing chain C, which meshes with a driving sprocket S1, rotated by a crankshaft, and two driven sprockets S2, each fixed to and rotatable with one of a pair of camshafts. A plunger 120 is protrudes slidably from a front end of the tensioner body 110, and the plunger applies tension to the chain C through a pivoted lever L1 by pressing the back of the lever at a location remote from the pivoted end of the lever. A fixed guide L2 guides the travel of the tension side of the timing chain C. Arrows indicate the direction of chain movement and the direction of rotation of the sprockets.

As shown in FIG. 2, the plunger 120, the outside of which is substantially cylindrical, fits slidably into a plunger-accommodating hole 111 formed in the housing 110. A plunger-biasing coil spring 130 is located in a high pressure oil chamber R, which is formed by the plunger 120 and the plunger-accommodating hole 111. This spring biases the plunger 120 in the protrusion direction.

A check valve unit 140 is incorporated in the tensioner at the bottom portion of the plunger-accommodating hole 111. The check valve unit blocks reverse flow of oil from the high pressure oil chamber R.

Figure 3:
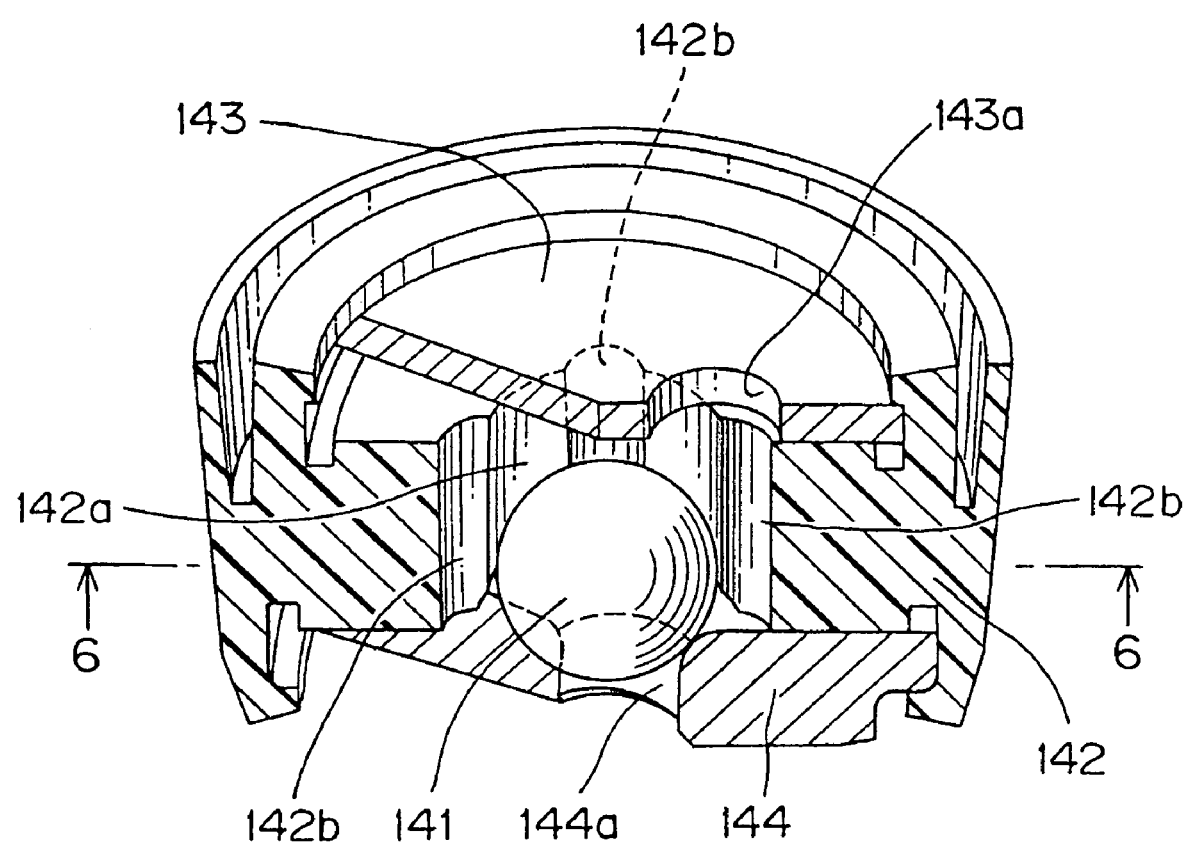
FIG. 3 is an enlarged, broken-away, perspective view of a check valve unit of the tensioner of FIG. 2.
Figure 4:
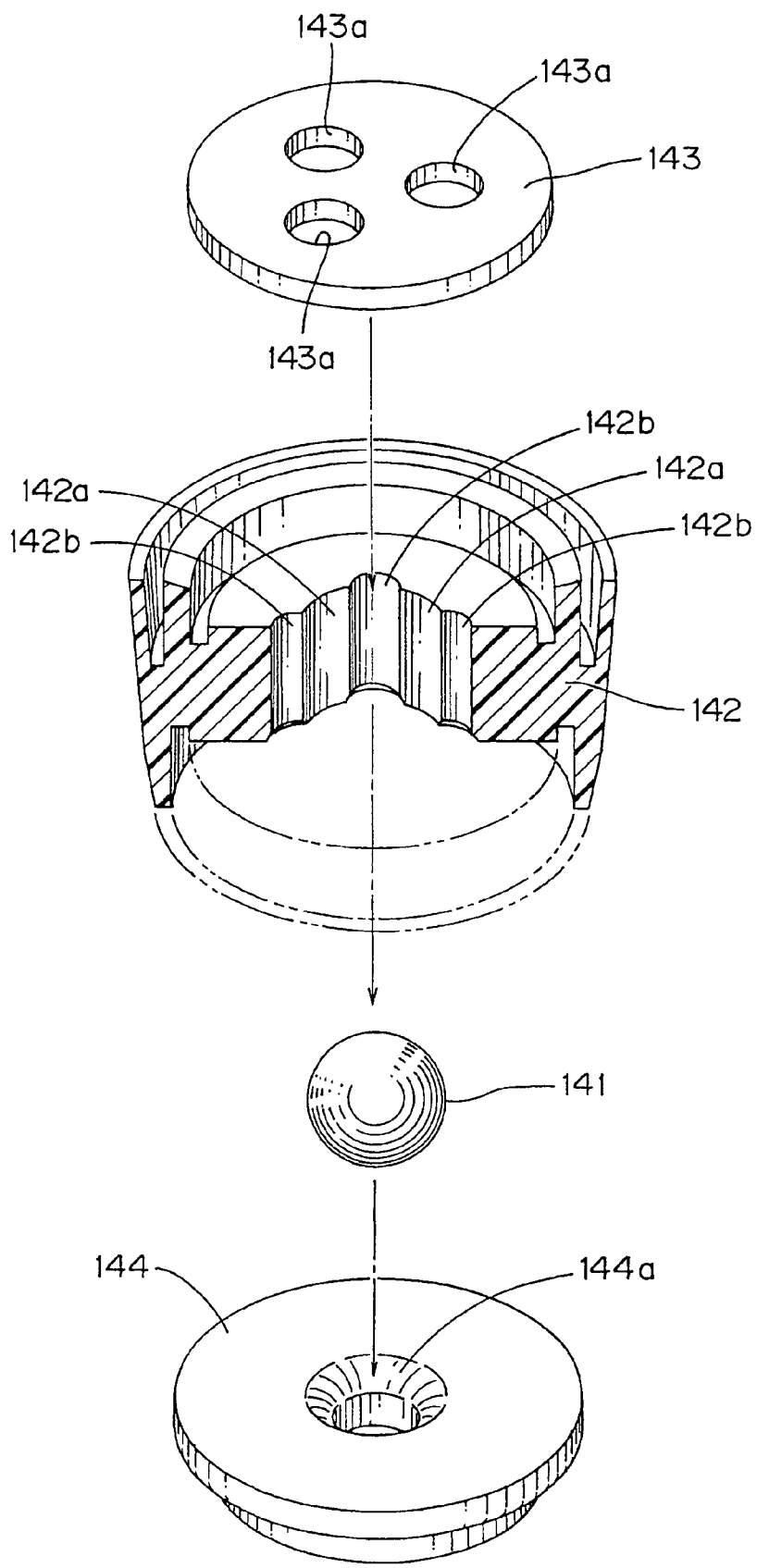
FIG. 4 is an exploded assembly view of the check valve unit of FIG. 2.
Figure 5:
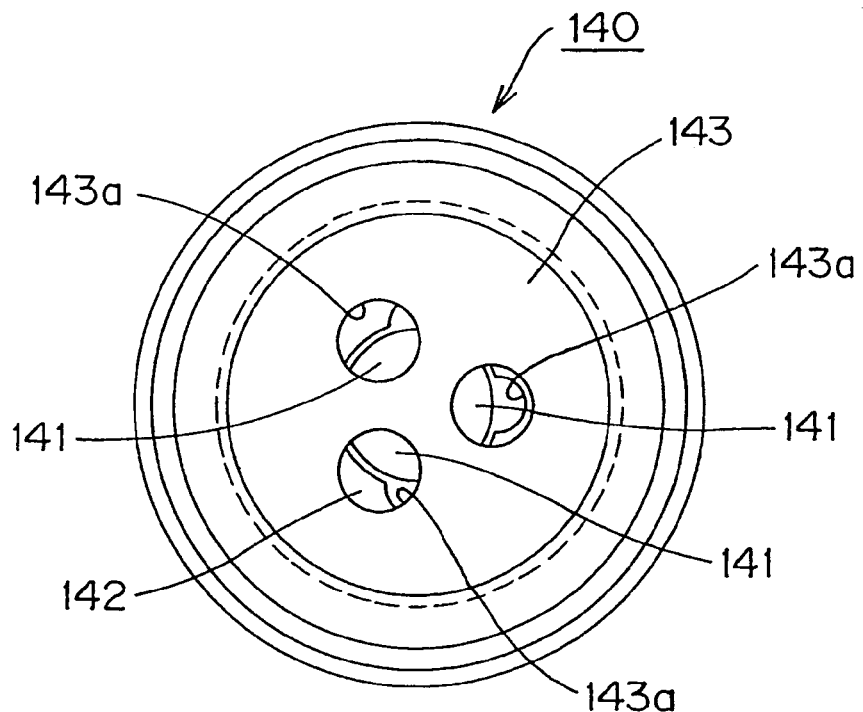
FIG. 5 is a plan view the check valve unit of FIG. 2.

As shown in FIGS. 3 and 4, a preferred check valve unit 140 is an assembly comprising a check ball 141, and a synthetic resin ball guide 142, including an inner wall 142*a* surrounding the check ball 141 and within which the check ball is free to move axially. The check valve unit also includes a disc-shaped retainer 143, which has a pressure oil communicating hole 143*a*. The retainer fits into an annular groove formed on the high pressure oil chamber side of the ball guide, and may be caulked. A metallic ball seat 144 is similarly engaged with a groove formed on the oil supply side of the ball guide, and may be caulked.

Figure 6:
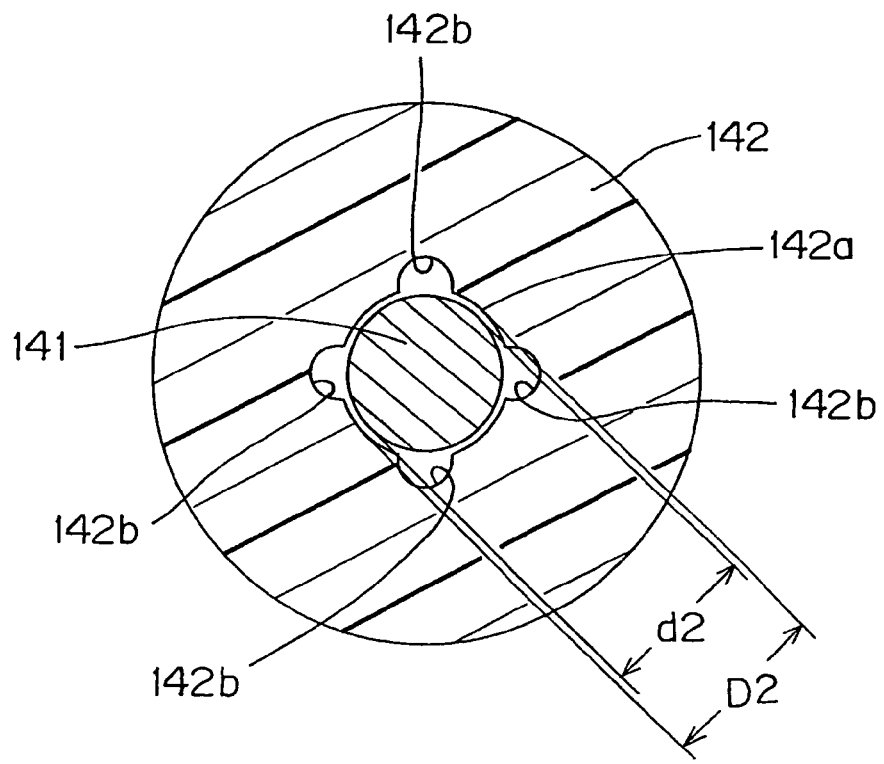
FIG. 6 is a cross-sectional view taken on section plane 6-6 of FIG. 3.
Figure 7:
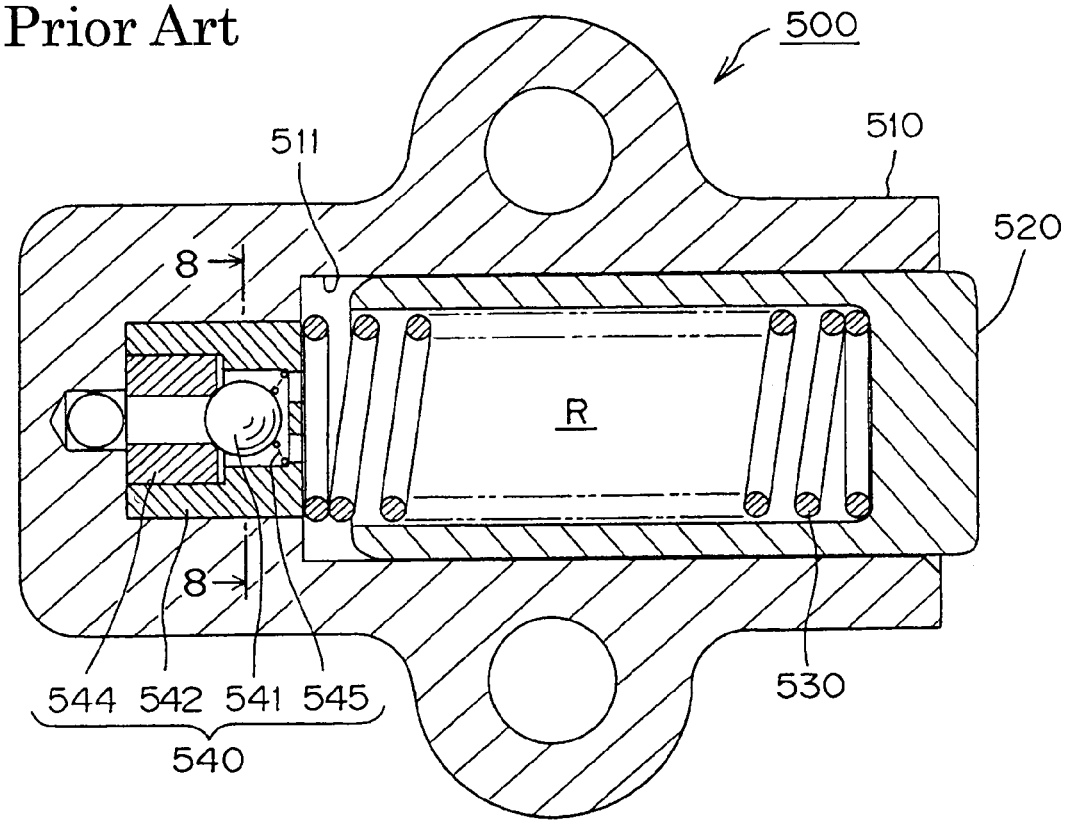
FIG. 7 is a cross-sectional view of a conventional hydraulic tensioner.
Figure 8:
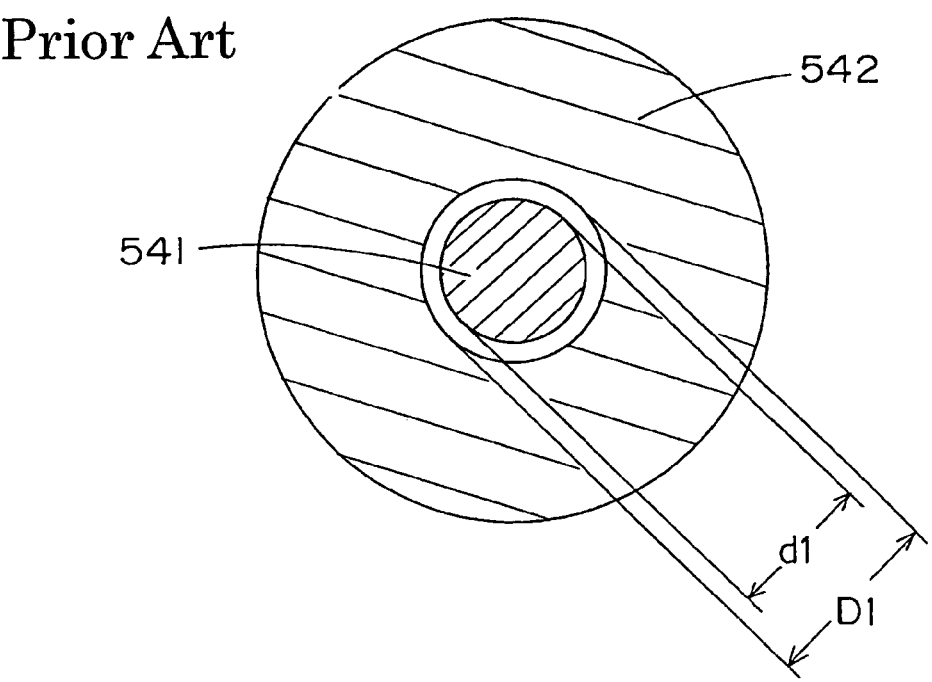
FIG. 8 is a cross-sectional view taken on section plane 8-8 in FIG. 7.

The inner wall of the ball guide 142 is provided with four arcuate grooves 142*b*, each groove preferably having a semicircular, or half-moon shaped, cross-section. Each of these four grooves is preferably disposed, as shown in FIG. 6, at a ninety degree relationship to its adjacent grooves about the central axis of the opening in the ball guide. These grooves conduct oil, past the check ball, from the oil supply side to the high pressure chamber side of the check valve unit 140.

The ball guide structure controls movement of the check ball 141 so that it moves smoothly and freely in the guide without moving irregularly or violently along the inner wall 142*a*, and without moving laterally in the guide so that the clearance on one side of the ball is greater than the clearance on the opposite side of the ball. The semicircular arcuate grooves 142*b* ensure that the inflow rate of oil for the maximum area of the opening between the check ball 141 and the ball seat 144 is maintained irrespective of the ball motion, and regardless of whether or not a gravitational force urges the ball toward the wall of the ball guide, as in the case where the tensioner is positioned so that oil flows through the ball guide in a direction other than vertical. Thus, the hydraulic tensioner can suppress violent motion of the check ball, and accurately follow changes in tension, even when the engine is operating at high rotational speeds, irrespective of the stroke of the check ball and the arrangement of the tensioner housing.

Assuming that the clearance between the ball and the guide is defined as one half the difference between the diameter D2 of the inner circumferential wall 142*a* of the guide and the diameter d2 of the check ball, as shown in FIG. 6, when the check ball has a diameter of 4 mm, for example, the clearance between the ball and the inner wall of the guide can be set to 0.6 mm or less without being influenced by the ball stroke, and violent motion of the check ball can be suppressed.

Since the synthetic resin ball guide 142 is subjected to high temperatures during engine operation, a polyamide resin such as nylon 46, nylon 66, glass fiber-reinforced nylon, or the like is preferably used. If the caulking of the outer circumferential area on the high pressure oil chamber side, and the outer circumferential area on the oil supply side of the ball guide, is carried out in a heated, softened, state, these areas can exhibit excellent shape retention.

Since the retainer 143 seals the check ball 141 within the ball guide 142 and is at the same time is abutted by an end of the plunger-biasing spring 130, it is preferably made of metal. The check ball 141 is preferably composed of metal, ceramic, or a synthetic resin or the like.

In the hydraulic tensioner 100, the high pressure oil chamber R is always filled with oil under pressure, supplied from outside the tensioner through the check valve unit 140 by an oil pump or the like. When the timing chain C loosens, the plunger 120, which is continuously by spring 130 in the protruding direction, takes up slack in the chain. As the plunger moves in the protruding direction, and the check valve opens so that oil flows into the high pressure oil chamber R.

When an impact force exerted by the timing chain C (FIG. 1) moves the plunger 120 in the retracting direction into the plunger-accommodating hole 111, against the biasing force of spring 130, the pressure of the oil in the high pressure oil chamber R is increased so that the check ball 141 of the check valve unit 140 is pushed on the ball seat 144. Consequently, reverse flow of oil from the high pressure oil chamber R to the oil supply passage 144*a* of the ball seat (FIGS. 3 and 4) is blocked.

When the reverse flow of oil is blocked, the oil pressure in the high pressure oil chamber R is further increased, and the oil leaks through a slight clearance between the outer circumferential surface of the plunger 120 and the inner circumferential surface of the plunger-accommodating hole 111. The leaking oil is discharged to the outside of the housing 110. Vibration of the plunger 120, which would otherwise result from the application of the impact force, is quickly damped because of the viscosity of the oil flowing through the leakage path surrounding the plunger.

In the hydraulic tensioner 100, four grooves 142*b*, each having a semicircular cross section, are provided on the inner wall 142*a* of the ball guide. These grooves 142*b* lead from the oil supply side toward the high pressure oil chamber R, and ensure that the inflow rate of oil can correspond to the maximum area of the opening between the check ball 141 and the ball seat 144. The minimum clearance between the check ball 141 and the ball seat 144 can be set in order to allow free motion of the check ball 141. Because of the presence of grooves 142*b*, this minimum clearance is not influenced by the inflow rate of the oil under the condition in which the check valve is fully opened. As a result, the hydraulic tensioner of the invention can suppress violent motion of the check ball 141 in the check valve unit 140, and accurately follow changes in tension at high engine rotational speeds. Furthermore, these desirable characteristics are exhibited irrespective of the stroke of the check ball 141 and the arrangement of the tensioner.

Various modifications can be made to the tensioner described above. For example, the principles of the invention can be realized in a ratchet-type hydraulic tensioner, in which a toothed rack formed on the outside of the plunger cooperates with a pawl pivoted on the tensioner housing. In addition, the grooves in the ball guide, although preferably formed in a semicircular, or half-moon, shape can be formed instead in other cross-sectional shapes, such as rectangular or triangular shapes. Furthermore, the number of the grooves, by which the inflow rate of oil corresponding to the maximum check valve opening is ensured, can be varied, although the number of grooves is preferably two to four.

The invention claimed is:

1. A hydraulic tensioner comprising:
    a tensioner housing having a plunger-accommodating hole, said hole having an opening at one end and a bottom;
    a plunger slidable in said plunger-accommodating hole and protruding therefrom, said plunger being adapted to maintain tension in a flexible, traveling power transmission medium, said plunger and said housing together cooperating to define a high pressure oil chamber;
    a plunger biasing spring, accommodated in said high pressure oil chamber, the plunger biasing spring urging the plunger in a protruding direction;
    a check valve unit at the bottom of said plunger-accommodating hole for allowing oil to flow into said high pressure oil chamber from an oil supply but blocking reverse flow of oil from said high pressure oil chamber;
    wherein said check valve unit comprises a check ball, a ball seat, a ball guide composed of synthetic resin, the ball guide having a flat end face facing the high pressure oil chamber, an end opposite from said flat end face and adjacent said ball seat, and an inner wall surrounding the check ball, and a disc-shaped retainer including at least one oil communicating hole, the disc-shaped retainer being attached to said ball guide and in facing contact with said flat end face of the ball guide;
    wherein the check ball is sealed in the ball guide, but freely movable therein, along an axis, toward and away from the ball seat, to allow oil to flow through the ball seat of the check valve unit, and through the guide and said at least one oil communicating hole, into the high pressure oil chamber but to block reverse flow of oil out of the high pressure oil chanter by seating of the check ball against the ball seat;
    wherein a plurality of oil communicating grooves is formed on said inner wall of the ball guide, said grooves extending through the ball guide from a location adjacent said ball seat to said end face, and providing an oil communication path past said check ball from the ball seat toward the high pressure oil chamber when the ball moves away from the ball seat, while the ball is prevented by said inner wall from violent movement within said ball guide;
    wherein the ball guide is fitted into the bottom of the plunger-accommodating hole;
    wherein the disc-shaped retainer and the ball seat are held in annular grooves formed in the ball guide; and
    wherein at least part of at least one oil communicating hole of the disc-shaped retainer is positioned so that it overlaps one of the at least one of said oil communicating grooves in the inner wall of the ball guide, whereby oil flowing through said at least one of the said oil communicating grooves can flow directly through said at least part of said at least one oil communicating hole of the disc-shaped retainer.

2. A hydraulic tensioner according to claim 1, in which said disc-shaped retainer has plural oil-communicating holes, and in which the number of said plural oil-communicating holes is sufficient that, at any rotational position of the disc-shaped retainer relative to said ball guide about said axis, at least one of said oil-communicating holes is positioned so that it overlaps one of said plurality of oil-communicating grooves.

3. A hydraulic tensioner according to claim 2, in which the number of said oil communicating grooves is four, and the number of said oil communicating holes in the disc-shaped retainer is three.

* * * * *

UNITED STATES PATENT AND TRADEMARK OFFICE
CERTIFICATE OF CORRECTION

| | |
|---|---|
| PATENT NO. | : 7,427,249 B2 |
| APPLICATION NO. | : 11/030021 |
| DATED | : September 23, 2008 |
| INVENTOR(S) | : Osamu Yoshida |

Page 1 of 1

It is certified that error appears in the above-identified patent and that said Letters Patent is hereby corrected as shown below:

In the Claims, Column 6, line 7, "chanter" should read --chamber--.

Signed and Sealed this

Sixth Day of January, 2009

JON W. DUDAS
*Director of the United States Patent and Trademark Office*